US007918076B2

(12) United States Patent
Talbot

(10) Patent No.: US 7,918,076 B2
(45) Date of Patent: Apr. 5, 2011

(54) DEVICE FOR MAINTAINING WING BALANCE ON A MULTI-SECTION HEADER

(75) Inventor: Francois R. Talbot, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 576 days.

(21) Appl. No.: 11/526,086

(22) Filed: Sep. 25, 2006

(65) Prior Publication Data
US 2008/0072560 A1    Mar. 27, 2008

(51) Int. Cl.
A01D 67/00 (2006.01)
(52) U.S. Cl. ............................................. 56/208; 56/228
(58) Field of Classification Search .................... 56/14.9, 56/15.3, 15.7–15.9, 134, 159, 228, 208; 172/311
See application file for complete search history.

(56) References Cited

U.S. PATENT DOCUMENTS

| 2,472,762 | A | * | 6/1949 | Sage | 56/15.7 |
| 2,915,870 | A | * | 12/1959 | Hume | 56/208 |
| 3,808,781 | A | * | 5/1974 | Bass et al. | 56/15.9 |
| 3,958,399 | A | * | 5/1976 | Schoeneberger | 56/15.8 |
| 3,959,957 | A | * | 6/1976 | Halls | 56/208 |
| 4,177,627 | A | * | 12/1979 | Cicci | 56/15.8 |
| 4,187,664 | A | * | 2/1980 | Meek et al. | 56/13.6 |
| 4,206,583 | A | * | 6/1980 | Week et al. | 56/15.8 |
| 4,206,584 | A | * | 6/1980 | Johnson et al. | 56/15.8 |
| 4,409,780 | A | | 10/1983 | Beougher et al. | |
| 4,446,683 | A | | 5/1984 | Rempel et al. | |
| 4,641,490 | A | * | 2/1987 | Wynn et al. | 56/10.2 E |
| 4,665,685 | A | | 5/1987 | Rupprecht | |
| 4,875,331 | A | | 10/1989 | Ostrup et al. | |
| 4,956,966 | A | | 9/1990 | Patterson | |
| 5,464,371 | A | | 11/1995 | Honey | |
| 6,675,568 | B2 | | 1/2004 | Patterson et al. | |
| 6,865,871 | B2 | | 3/2005 | Patterson et al. | |

* cited by examiner

Primary Examiner — Thomas B Will
Assistant Examiner — Mai Nguyen
(74) Attorney, Agent, or Firm — Adrian D Battison; Ade & Company

(57) ABSTRACT

A crop harvesting header includes a center portion mounted on two spring arms and two separate wings pivotally connected to the center portion. The wings are connected to the center portion by interconnecting linkages which transfer weight from the wings to the spring arms each including a balance beam arranged to balance the lifting force from the spring arm with the downward forces from the center portion and wing such that the downward force on a skid plate of each portion on the ground varies automatically as the total downward force is varied. The balance beams apply force to the linkages by a compression member to reduce forces. The movement caused by floating of the header and the change of angle of the header are compensated at the balance beam to ensure that the force to the wings is reduced as the requirement caused by changes in geometry reduces.

19 Claims, 10 Drawing Sheets

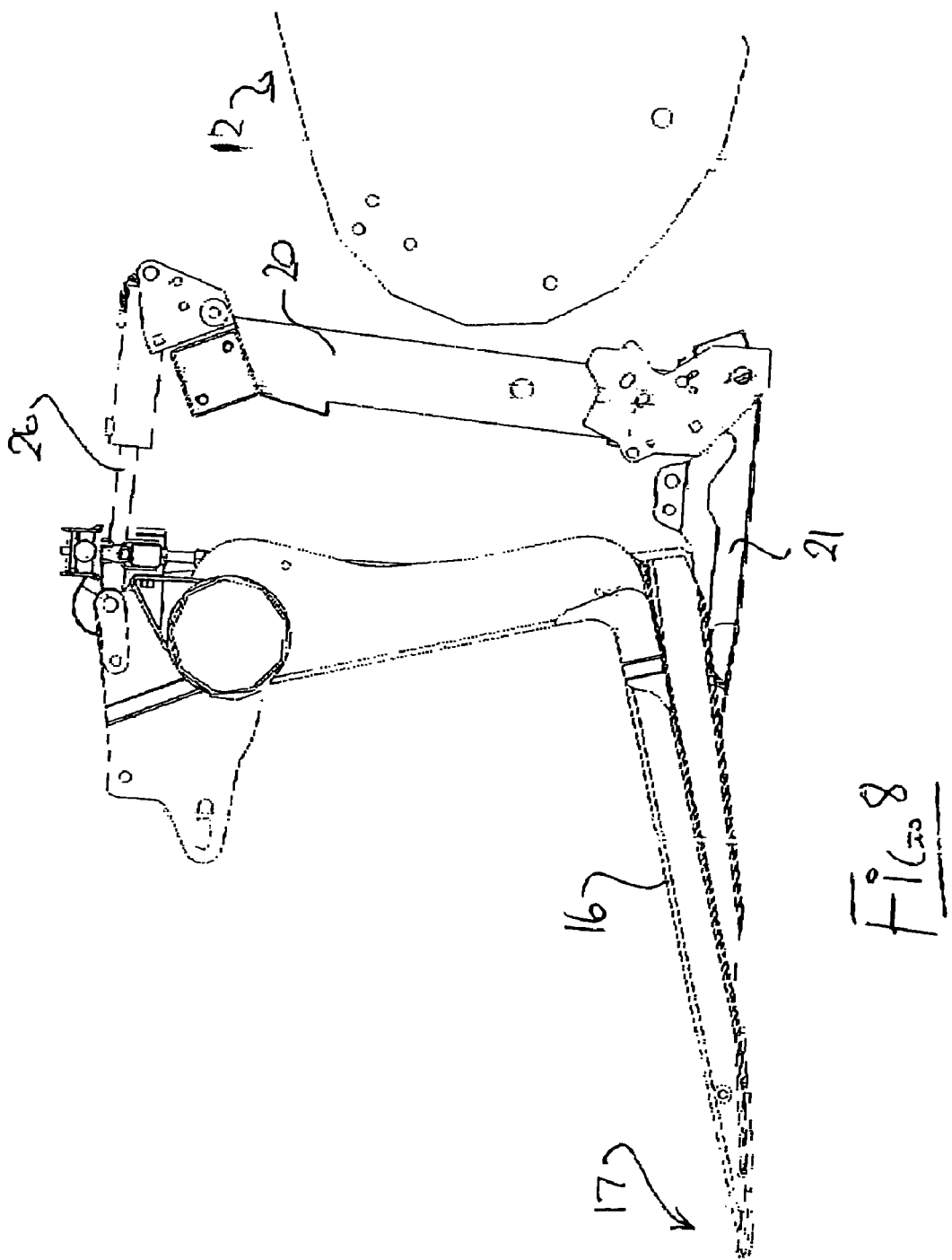

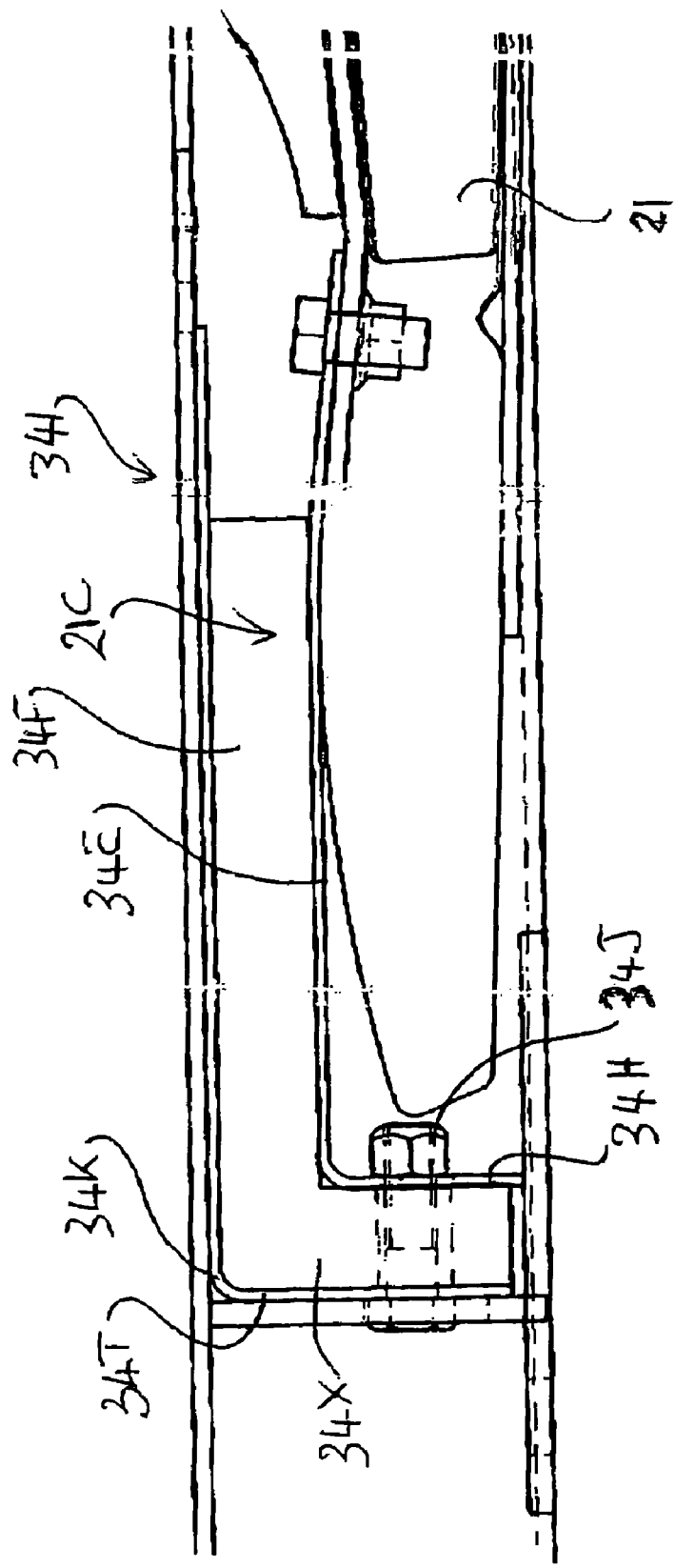

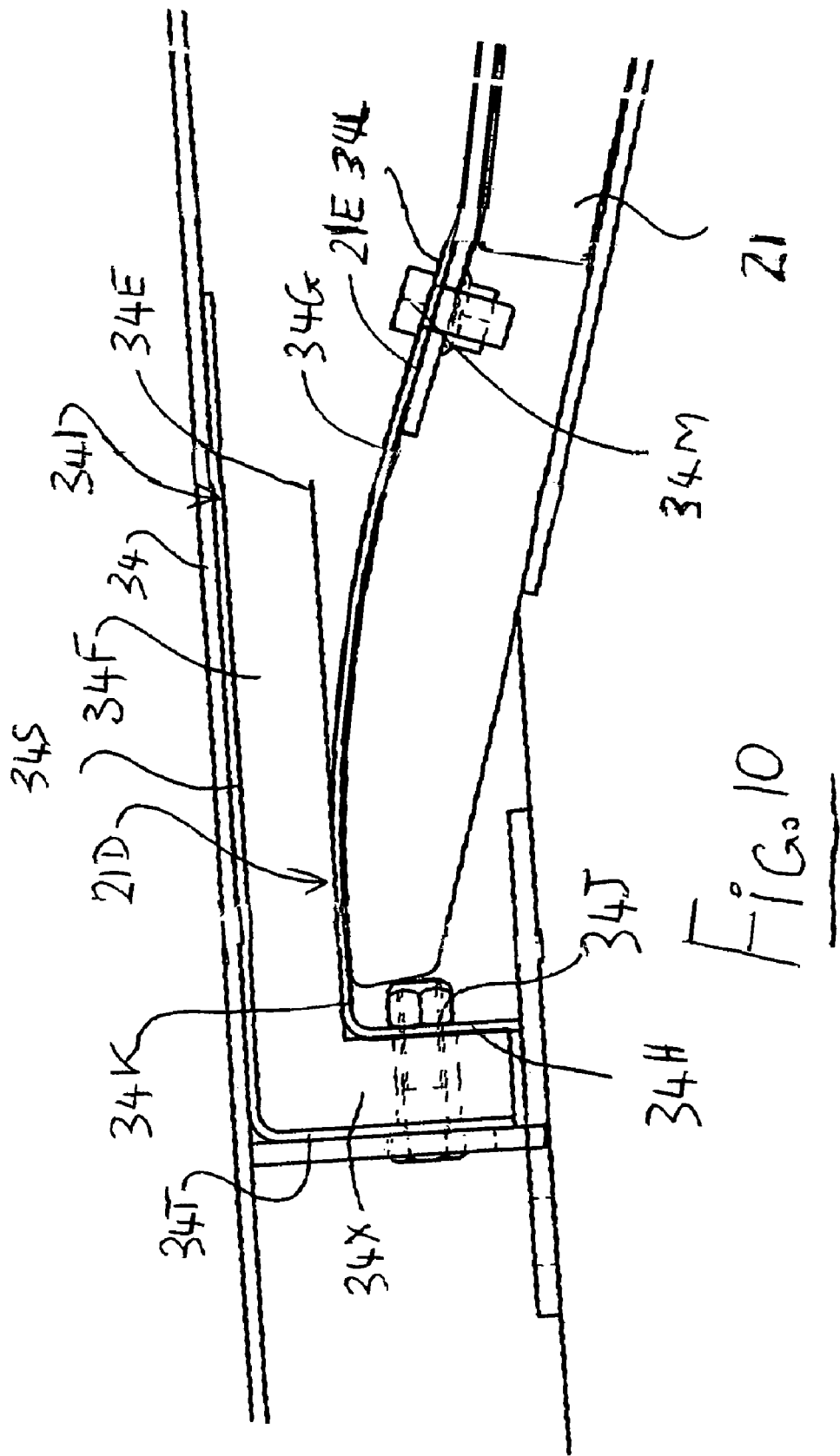

DEVICE FOR MAINTAINING WING BALANCE ON A MULTI-SECTION HEADER

This invention relates to header of a crop cutting apparatus such as a swather or a combine harvester which includes multiple sections defining a center section and two wing sections where the sections are balanced to maintain a constant ground force across the width as the total ground force changes.

BACKGROUND OF THE INVENTION

Headers for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

Many headers are of a type in which the cutter bar is intended to be in a fixed rigid position relative to the main support tube so that the cutter bar is not intended to flex or float relative to the main structural tube in response to changes in ground contour.

This rigid type of header has the advantage that it allows more accurate control of the position of the fingers or bats of the reel relative to the cutter bar so as to more accurately control the crop as it is swept onto the cutter bar and the table rearwardly of the cutter bar.

In this rigid header type, therefore, the support beams extending forwardly from the main structural tube are substantially rigid and hold the cutter bar in fixed position.

Alternative types of header mount the cutter bar for floating or flexing movement relative to the main structural support tube. This type of header is used to provide an improved action in following the contour of the ground and is advantageous in some circumstances. Thus when cutting crops right at the ground it is desirable that the cutter bar of larger headers, greater than of the order of 20 feet, is somewhat flexible to follow the ground contour. This type of header however has the disadvantage that the flexing or floating of the cutter bar relative to the main support tube causes movement of the cutter bar relative to the bats or fingers of the reel so that it is no longer possible to maintain a close tolerance between the bats or fingers and the cutter bar.

Various manufacturers provide a flexing cutter bar structure for example the Soybean Header manufactured by Case IH under the Model No 820 or 1020.

Another type of header provides a cutter bar which is relatively rigid but can float upwardly and downwardly relative to the main structural support tube of the header. This type of header again is used to allow close floating-action of the cutter bar on the ground surface and one example is shown in the "Dial-a-matic Header Height Control" available for various Deere and Company combine harvesters. This floating action of a cutter bar however occurs relative to the main structural tube and therefore relative to the reel so that the cutter bar to reel co-operation cannot be optimized.

It is known that rigid headers are conventionally flexibly mounted to the propulsion machine, that is a swather tractor, combine harvester or pull type frame, and the header as one piece can generally follow the ground contour while the cutting knife remains rigid.

It is also known that headers of this type can be controlled so that they rotate around an axis at a center of the header in response to sensors which detect ground height so as to maintain the sides of the header as close to the ground as possible.

When cutting above the ground, a header of this type with a rigid knife structure is most effective because the rigid knife structure allows maximum cutting speed and thus an improved cutting action.

When cutting on the ground with larger headers, it is known to have a cutter bar which is mounted on the header so that it can flex or float across its width relative to the ground. Examples of such flexible cutter bars are shown in U.S. Pat. No. 4,665,685 (Rupprecht) issued May 19, 1987 and U.S. Pat. No. 4,875,331 (Ostrup) issued Oct. 24, 1989. Both of these arrangements show a cutter bar which is mounted on a skid and thus skids across the ground and flexes across its whole width to accommodate changes in height of the ground.

One disadvantage of the conventional flexible cutter bar is that it may in some designs require a significantly reduced cutting speed since the reciprocation of the conventional sickle knife must be reduced in velocity to accommodate the curvature of the cutter blade which can occur when the whole of the cutter blade is flexible. Conventionally a flexible cutter bar of this type can flex as much as a total of five to six inches to accommodate the changes in ground height which occur relative to the fixed part of the header frame which remains fixed and does not change relative to ground height.

A further disadvantage of a flexible cutter bar of this type is that it is necessary to set the reel at a height which accommodates the upward movement of the cutter bar which can occur. The reel fingers therefore must necessarily be spaced a significant distance from the cutter bar to avoid the possibility that the raised cutter bar interferes with the fingers and causes damage to either or both. This increased distance between the fingers of the reel and the cutter bar can cause irregular or improper feed of the crop material over the cutter bar particularly in light crop conditions so that an accumulation of cut crop on the cutter bar can eventually halt further cutting action leaving a part of the crop uncut and thus unharvested.

The disadvantage of the rigid cutter bar design is that rather than floating over a small area like a ridge or gopher mound, the rigid header pushes dirt in front of the sickle knife which impedes cutting and allows dirt to enter the header with the crop.

Up till now, therefore, the rigid header arrangement with its accurate reel finger to cutter bar location is not fully satisfactory as it cannot accurately follow ground contour; and the flexible cutter bar design, which can follow ground contour, is also not fully satisfactory in view of the increased and varying space between the reel fingers and the cutter bar.

In U.S. Pat. No. 4,956,966 (Patterson) issued September 1990 and assigned to the present Assignee is disclosed a header which includes drapers for transporting the crop inwardly from the sides of the header toward the central discharge section. The use of drapers can provide an arrangement which allows the header table to flex although the arrangement shown in the patent and the product manufactured in accordance with the patent provides a rigid header of the type described above. The header of Patterson includes a central link by which the position of the upper end of the header can be pulled toward or released from the supporting vehicle so as to change the angle of the frame of the header about an axis across the width of the header. A skid plate can be provided just behind the cutter bar which can run across the ground so that the change in angle of the header changes the angle of the cutter bar in front of the skid plate.

In U.S. Pat. No. 5,464,371 (Honey) issued November 1995 to Honeybee Manufacturing is disclosed a draper header of a type similar to that disclosed in Patterson.

In U.S. Pat. No. 4,446,683 (Remple) issued May 1984 to Canadian Co-operative Implements is disclosed a header for a swather which includes a central section and two wing sections in which the wing sections can pivot about a forwardly extending axis to allow the outer ends of the wing sections to be raised to a height as much as six feet from the ground. The cutter bar is continuous through the pivot axes so that the cutter bar flexes as the hinging action occurs. The patent led to development of a product manufactured by the above company which utilized the arrangement of the wing sections and the flexible cutter bar. There were a significant number sold but it is not being built any more and the arrangement is no longer commercial. The device supported the center section on the swather tractor but the wing sections were supported upon individual ground wheels mounted at the ends of the wing sections. It is necessary therefore to control the height of the wing sections by actuating movement of the ground wheels and this arrangement therefore did not allow the system to accurately follow the ground contour.

In U.S. Pat. No. 4,409,780 (Beogher) issued October 1983 to Kansas State University is disclosed a header with three independent sections so that two wing sections can be folded rearwardly for transport. However this arrangement does not provide a flexible arrangement which allows the cutter bar as a whole to accurately follow the ground contour.

In U.S. Pat. No. 6,675,568 (Patterson) issued Jan. 13, 2004 to the present Assignees is disclosed a crop harvesting header for mounting on a propulsion vehicle such as a swather tractor or combine harvester which includes a main frame structure supporting a crop receiving table with a cutter bar across a front of the table and side drapers on the table for moving the cut crop toward a discharge location of the header. The frame is divided into a central frame portion and two separate wing frame portions each arranged for pivotal movement relative to the central portion about a pivot axis extending in a plane parallel to the forward direction and intersecting the cutter bar so that, as the wing frame portions pivot, the cutter bar flexes in the area adjacent the respective pivot axis over a small angle of the order of 4 degrees to maintain the cutter bar following the ground. The central frame portion is mounted on two spring arms for upward and twisting floating movement such that the total downward force on the ground, from that part of the weight of all of the portions of the header which is unsupported, can be varied by moving the support to change the total pressure of the header on the ground. The wing frame portions are connected to the central frame portion by interconnecting linkages which transfer weight from the wing frame portions to the springs of the central portion each including a respective balance beam arranged to balance the lifting force from the spring with the downward forces from the center portion and wing frame portion such that the downward force on a skid plate of each portion on the ground varies automatically as the total downward force is varied.

SUMMARY OF THE INVENTION

It is one object of the present invention to provide an improved header based on the concept generally disclosed in the above Patterson patent.

According to a first aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first spring biased lifting member for applying a first spring lifting force and a second spring biased lifting member for applying a second spring lifting force arranged at transversely spaced positions on the center portion of the main frame structure;

a first linkage for applying a first wing lifting force to the first wing frame portion tending to support the first wing frame portion against said rotating movement about the first pivot coupling;

a second linkage-for applying a second wing lifting force to the second wing frame portion tending to support the second wing frame portion against said rotating movement about the second pivot coupling;

a first balance system including a first balance beam pivotally connected at a first pivot connection to the center portion of the main frame structure for applying a first center portion lifting force to the center portion;

the first balance beam being connected to a first compression member of the first balance system so as to apply the first wing lifting force as a compression force longitudinally of the first compression member;

the first balance beam being arranged to receive the first spring lifting force from the first spring biased lifting member at a first lift position therealong between the first pivot connection and the first compression member so as to balance the first spring lifting force between the first center portion lifting force and the first wing lifting force;

and a second balance system including a second balance beam pivotally connected at a second pivot connection to the center portion of the main frame structure for applying a second center portion lifting force to the center portion;

the second balance beam being connected to a second compression member of the second balance system so as to apply the second wing lifting force as a compression-force longitudinally of the second compression member;

the second balance beam being arranged to receive the second spring lifting force from the second spring biased lifting member at a second lift position therealong between the second pivot connection and the second compression member so as to balance the second spring lifting force between the second center portion lifting force and the second wing lifting force.

Preferably the first balance beam is arranged such that a distance of the first pivot connection to the lift position is greater than the distance of the first lift position to the first compression member and wherein the second balance beam is arranged such that a distance of the second pivot connection to the second lift position is greater than the distance of the second lift position to the second compression member. In this way the forces in the compression member can be maintained relative low allowing the use of flexible bushings as coupling elements and thus reducing friction.

Preferably the first and second balance beams are oriented such that each has its longitudinal direction parallel to the forward direction. The balance beams can thus be located at the mounting of the lift arms at the forwardly extending frame members of the header. However another location and another orientation can be selected for the beams.

Preferably the first balance beam is pivoted on the first pivot connection at a forward end thereof and the second balance beam is pivoted on the second pivot connection at a forward end thereof. This allows the first and second pivot connections to be arranged as far forward as possible adjacent the cutter bar.

Preferably the first balance beam and the first linkage is arranged such that the first wing lifting force and the first center portion lifting force vary proportionally and wherein the second balance beam and the second linkage is arranged such that the second wing lifting force and the second center portion lifting force vary proportionally.

Preferably the first spring biased lifting member includes a first lift arm extending in the forward direction parallel to and underneath the first balance beam and wherein the second spring biased lifting member of the mounting assembly includes a second lift arm extending in the forward direction parallel to and underneath the second balance beam.

According to a second aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first spring biased lifting member for applying a first spring lifting force and a second spring biased lifting member for applying a second spring lifting force arranged at transversely spaced positions on the center portion of the main frame structure;

a first linkage for applying a first wing lifting force to the first wing frame portion tending to support the first wing frame portion against said rotating movement about the first pivot coupling;

a second linkage for applying a second wing lifting force to the second wing frame portion tending to support the second wing frame portion against said rotating movement about the second pivot coupling;

a first balance beam pivotally connected at a first pivot connection to the center portion of the main frame structure for applying a first center portion lifting force to the center portion;

the first balance beam being connected to the first linkage so as to apply thereto the first wing lifting force;

the first balance beam being arranged to receive the first spring lifting force from the first spring biased lifting member at a first lift position therealong so as to balance the first spring lifting force between the first center portion lifting force and the first wing lifting force;

and a second balance beam pivotally connected at a second pivot connection to the center portion of the main frame structure for applying a second center portion lifting force to the center portion;

the second balance beam being connected to the second linkage so as to apply thereto the second wing lifting force;

the second balance beam being arranged to receive the second spring lifting force from the second spring biased lifting member at a second lift position therealong so as to balance the second spring lifting force between the second center portion lifting force and the second wing lifting force;

wherein the mounting assembly is connected to the main frame structure so as to allow adjustment movement of the main frame structure relative to the mounting assembly;

wherein there is provided a first element responsive to the adjustment movement to operate on the first balance beam to change the balance of forces between the first wing lifting force and the first center portion lifting force in proportion to the amount of adjustment movement;

and wherein there is provided a second element responsive to the adjustment movement to operate on the second balance beam to change the balance of forces between the second wing lifting force and the second center portion lifting force in proportion to the amount of adjustment movement.

The above definition refers to the balance of forces being changed in proportion to the amount of the adjustment movement. This is not intended to be limited to a direct or linear proportionality since the geometry involved may require different effects on the forces for different amounts of movement. However the intention is that the adjustment movement through its length will cause some change in the balance of forces so as to maintain as far as possible the required lifting force on the wings to keep them properly positioned relative to the center portion.

In most cases, the mounting assembly will include at least one upper mounting link connected to the main frame structure which is operable to effect an angle change of the crop receiving table and the cutter bar relative to the ground about an axis generally parallel to the cutter bar where the first and second elements are responsive to the change of angle.

In this case it is generally desirable that the first element is arranged to reduce the first wing lifting force relative to the first center portion lifting force when the header is pivoted to increase the angle of the table relative to the ground and wherein the second element is arranged to reduce the second wing lifting force relative to the second center portion lifting force when the header is pivoted to increase the angle of the table relative to the ground.

As an alternative or in addition, the mounting assembly can be connected to the main frame structure in a manner which allows the height of the mounting assembly to be changed relative to the main frame structure to allow the skid element to rest on the ground in a floating action where the first and second elements are responsive to the change of height.

Preferably the first element is arranged to reduce the first wing lifting force relative to the first center portion lifting force when the mounting assembly is lowered relative to the main frame structure and wherein the second element is arranged to reduce the second wing lifting force relative to the second center portion lifting force when the mounting assembly is lowered relative to the main frame structure.

In one arrangement, the first element is arranged to apply an additional force to the first balance beam and the second element is arranged to apply an additional force to the second balance beam. In this arrangement, the additional force can be applied by a first spring connected between the first balance beam and the mounting assembly and a second spring connected between the second balance beam and the mounting assembly.

In another arrangement, the first element is arranged to move along the first balance beam either the first lift position or a point of application of one of the first center portion lifting force and the first wing lifting force and the second element is arranged to move along the second balance beam either the second lift position or a point of application of one of the second center portion lifting force and the second wing lifting force.

In particular it is preferred in this construction that the first element is arranged to move the first lift position along the first balance beam and the second element is arranged to move the second lift position along the second balance beam.

In this arrangement, preferably the first spring biased lifting member includes a first arm extending longitudinally of the first balance beam and wherein the first arm includes a first surface which is shaped such that its point of contact with the first balance beam moves longitudinally of the first balance beam as an angle between a longitudinal direction of the first arm and a longitudinal direction of the first balance beam changes and the second spring biased lifting member includes a second arm extending longitudinally of the second balance beam and the second arm includes a second surface which is shaped such that its point of contact with the second balance beam moves longitudinally of the second balance beam as an angle between a longitudinal direction of the second arm and a longitudinal direction of the second balance beam changes.

Preferably in this construction the surface of the first arm is curved along its length and there is provided a first spring strip attached to the first balance beam and to the first arm with the curved surface of the first arm rolling along the first spring strip as the angle of the first arm relative to the first balance beam changes and the surface of the second arm is curved along its length and there is provided a second spring strip attached to the second balance beam and to the second arm with the curved surface of the second arm rolling along the second spring strip as the angle of the second arm relative to the second balance beam changes.

According to a third aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first spring biased lifting member for applying a first spring lifting force and a second spring biased lifting member for applying a second spring lifting force arranged at transversely spaced positions on the center portion of the main frame structure;

a first linkage for applying a first wing lifting force to the first wing frame portion tending to support the first wing frame portion against said rotating movement about the first pivot coupling;

a second linkage for applying a second wing lifting force to the second wing frame portion tending to support the second wing frame portion against said rotating movement about the second pivot coupling;

a first balance beam pivotally connected at a first pivot connection to the center portion of the main frame structure for applying a first center portion lifting force to the center portion;

the first balance beam being connected to the first linkage so as to apply thereto the first wing lifting force;

the first balance beam being arranged to receive the first spring lifting force from the first spring biased lifting member at a first lift position therealong so as to balance the first spring lifting force between the first center portion lifting force and the first wing lifting force;

and a second balance beam pivotally connected at a second pivot connection to the center portion of the main frame structure for applying a second center portion lifting force to the center portion;

the second balance beam being connected to the second linkage so as to apply thereto the second wing lifting force;

the second balance beam being arranged to receive the second spring lifting force from the second spring biased lifting member at a second lift position therealong so as to balance the second spring lifting force between the second center portion lifting force and the second wing lifting force;

wherein the mounting assembly is connected to the main frame structure so as to allow adjustment movement of the main frame structure relative to the mounting assembly;

wherein there is provided first spring connected between the first balance beam and the mounting assembly responsive to the adjustment movement to apply a force to the first balance beam;

and wherein there-is provided second spring connected between the second balance beam and the mounting assembly responsive to the adjustment movement to apply a force to the second balance beam.

According to a fourth aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of-the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first spring biased lifting member for applying a first spring lifting force and a second spring biased lifting member for applying a second spring lifting force arranged at transversely spaced positions on the center portion of the main frame structure;

a first linkage for applying a first wing lifting force to the first wing frame portion tending to support the first wing frame portion against said rotating movement about the first pivot coupling;

a second linkage for applying a second wing lifting force to the second wing frame portion tending to support the second wing frame portion against said rotating movement about the second pivot coupling;

a first balance beam pivotally connected at a first pivot connection to the center portion of the main frame structure for applying a first center portion lifting force to the center portion;

the first balance beam being connected to the first linkage so as to apply thereto the first wing lifting force;

the first balance beam being arranged to receive the first spring lifting force from the first spring biased lifting member at a first lift position therealong so as to balance the first spring lifting force between the first center portion lifting force and the first wing lifting force;

and a second balance beam pivotally connected at a second pivot connection to the center portion of the main frame structure for applying a second center portion lifting force to the center portion; the second balance beam being connected to the second linkage so as to apply thereto the second wing lifting force;

the second balance beam being arranged to receive the second spring lifting force from the second spring biased lifting member at a second lift position therealong so as to balance the second spring lifting force between the second center portion lifting force and the second wing lifting force;

wherein the mounting assembly is connected to the main frame structure so as to allow adjustment movement of the main frame structure relative to the mounting assembly;

wherein the first lift position is moved along the first balance beam in response to said adjustment movement, and wherein the second lift position is moved along the second balance beam in response to said adjustment movement.

In many cases, as defined hereinafter there is provided a central section mounted on the vehicle and two wing sections, which is in most cases the most practical arrangement providing sufficient flexibility without excessive complication and expense. However the principles of this invention can be applied to alternative constructions which allow a plurality of sections to be carried on a propulsion vehicle and for the weight per unit length of each as applied to the ground to vary as the total weight is varied.

Thus in one example there may also be two additional outer wing portions each pivotally mounted to an outer end of the inner wing potion and each having a respective pivot coupling and linkage which controls the position of the cutter bar as defined herein.

In most but not necessarily all cases, the header will include a conventional reel. If included, the fact that the reel is mounted in conventional manner so that its position is in a specified location relative to the main frame of each portion ensures that it is in a specific relation to the cutter bar or each portion. In the preferred arrangement where the frame includes a center portion and two wing portions, the reel may be located on two end arms each supported on the outer ends of the wing portions and also on a central arm mid way across the center portion, since this provides three points where the inter-relation between the reel and the cutter bar is specified, even though the positions in between may vary. In another arrangement, the reel may be mounted on four arms, two at each end and two at the pivot points, which provides improved control over the reel to cutter bar distance but increases the complexity of the reel.

The reel is preferably of the type mounted on conventional arms pivoted to the frame which allow adjustment of the height of the reel relative to the cutter bar. Suitable engineering arrangements for providing the necessary flexing and expansion of the sections of the reel to accommodate the flexing action of the header are well known to one skilled in the art. In addition, fixed reels attached at fixed location to end sheets of the header frame could also be used and the invention is not limited in this regard.

The term "spring" as used in this document is not intended to be limited to a particularly type of element which provides a spring or biasing force but merely defies any element which will allow resilient movement of one component relative to another. This can be provided by a mechanical flexing link such as a coil or tension spring or can be provided by fluid such as air or hydraulic cylinders and the term is also intended to include the suitable mechanical couplings of those links to the required elements. Hydraulic cylinders with suitable accumulators for taking up and releasing fluid to the cylinders are effective in this regard.

This specification refers to "bending" of the cutter bar. This bending movement can be obtained by providing a specific hinge between two parts of the bar or by providing a cutter bar which can flex sufficiently to accommodate the required bending without the necessity for an actual hinge defining a specific pivot axis.

The term "skid element" used in the above definition is not intended to be limited to a particular component of the header and may be provided by any element which physically engages the ground as the cutter bar and knife elements carried thereby proceed across the ground. Thus the skid element may be provided by the cutter bar itself or by an additional component behind the cutter bar. In addition, closely spaced rollers or other elements which roll over the ground and thus reduce friction may be used provided that the lifting force is spread evenly across the cutter bar to provide the floating action to which this invention is directed, although this is not generally necessary and not conventionally used.

The mounting assembly may be an adapter frame arranged for connection of the header to an existing feeder house of a combine harvester. However such an adapter is not essential and the mounting assembly may be constituted by simply connecting elements which directly couple the header to the combine harvester.

Preferably, where each of the portions includes a conventional horizontal main frame beam, the pivot coupling between the second frame portion and the first frame portion is arranged below the main beams.

Preferably the pivotal movement between the second frame portion and the first frame portion is less than a total of 6 degrees and more preferably less than 4 degrees, which angles are sufficient to provide the flexibility of the cutter bar which is required without providing any additional movement for transport or the like. This limited movement provides a simple construction and may avoid the necessity for a hinge in the cutter bar while allowing a single high speed knife to move along the cutter bar through the hinge or flex section.

In most cases the header is unsupported by ground wheels such that all lifting forces from the ground are communicated through said skid element.

BRIEF DESCRIPTION OF THE DRAWINGS

Embodiments of the invention will now be described in conjunction with the accompanying drawings in which:

FIG. 8 is a cross sectional view of the embodiment of FIG. 6 showing the header at a float position relative to the mounting assembly.

FIG. 9 is a cross sectional view of the embodiment of FIG. 6 showing one portion at an increased scale at a first position.

FIG. 10 is a cross sectional view of the portion of FIG. 9 at a second position.

In the drawings like characters of reference indicate corresponding parts in the different figures.

DETAILED DESCRIPTION

Reference is made to U.S. Pat. No. 6,865,871 (Patterson) issued Mar. 15, 2005 which disclose details of an adapter for mounting a header on a combine harvester, the disclosure of which is incorporated herein by reference.

Figure 1:
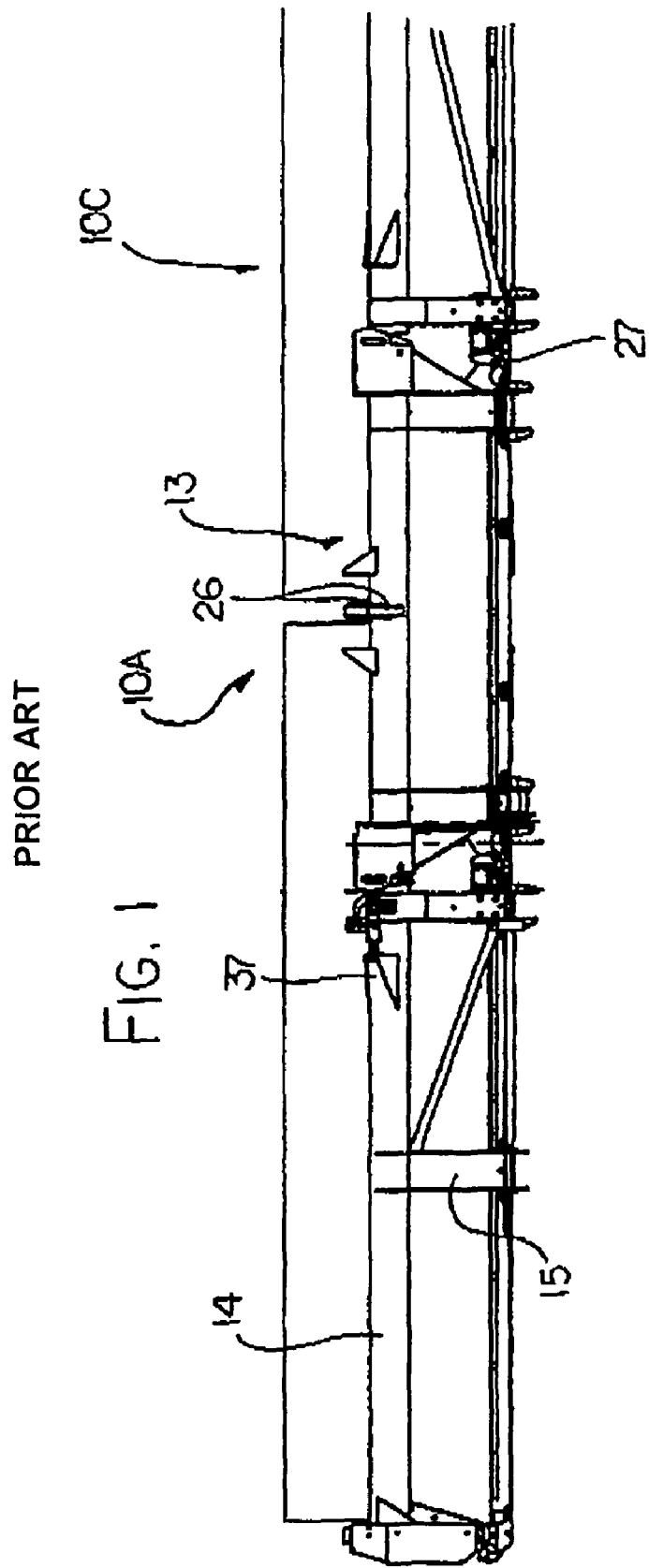
FIG. 1 is taken from U.S. Pat. No. 6,675,568 and shows the PRIOR ART schematic rear elevational view of header of the general type with which the present invention is concerned with the combine harvester which acts as a propulsion vehicle and the associated adapter being omitted for convenience of illustration.
Figure 2:
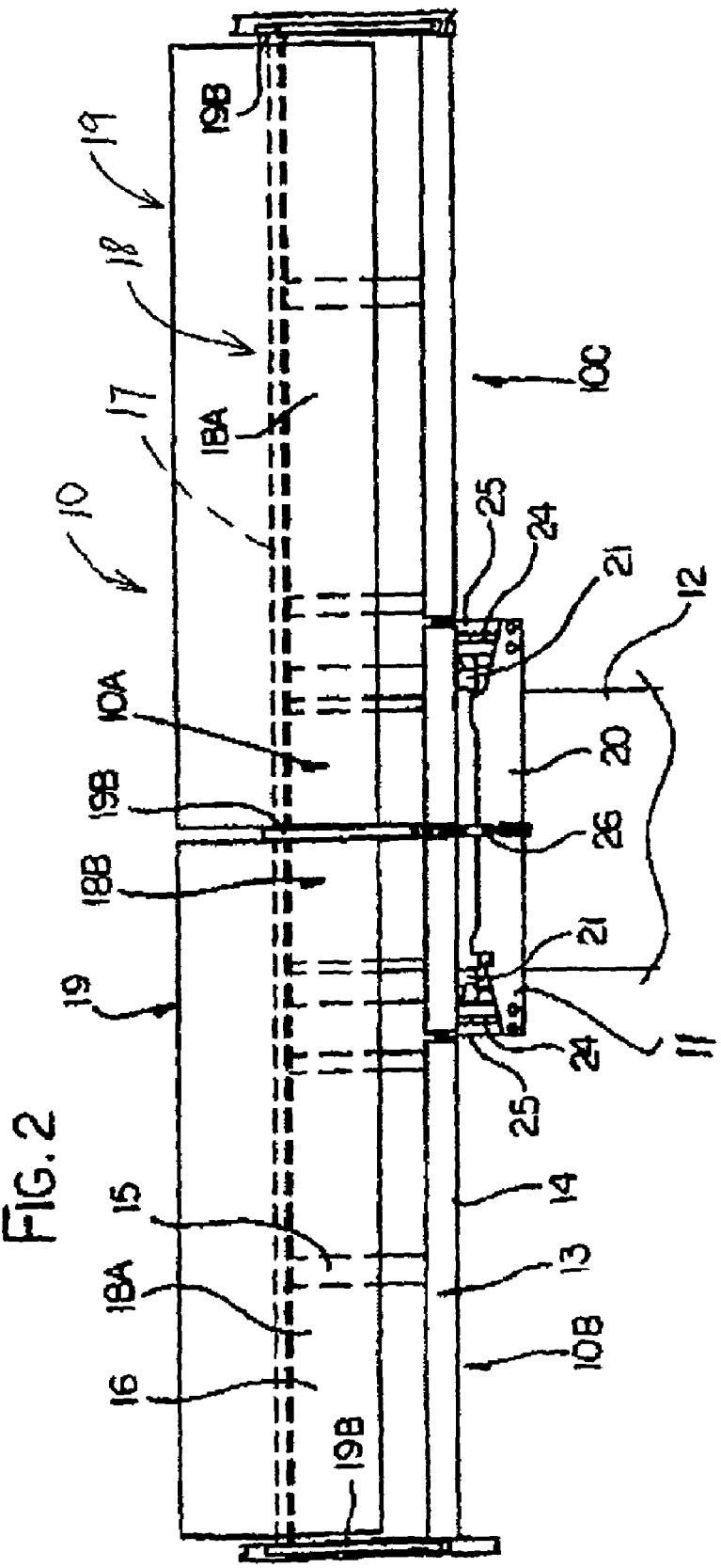
FIG. 2 is taken from U.S. Pat. No. 6,675,568 and shows the PRIOR ART schematic top plan view of the header of FIG. 1.

Reference is also made to U.S. Pat. No. 6,675,568 (Patterson) issued Jan. 13, 2004 which disclose details of a flexible header of the general type with which the present invention is concerned, the disclosure of which is incorporated herein by reference. FIGS. 1 and 2 and part of the following description are taken from that Patent for the convenience of the reader. Further details not included herein can be obtained by reference to that patent.

FIGS. 1 and 2 show in rear elevational view and in plan view respectively a header 10 carried on an adapter 11 or mounting assembly attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper system 18 thus include two side drapers 18A extending from respective ends of the header inwardly toward the feeder house and a center adapter section 18B which acts to feed the crop from the side drapers 18A rearwardly to the feeder housing.

The header further includes a reel 19 including a beam on which is mounted a plurality of reel bats (not shown) which are carried on the beam for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on three arms 19B including two arms at the ends of the header and a single center arm. However additional arms may be provided so that there are four such arms with two center arms being spaced apart either side of the adapter 11. It is well known to provide an arrangement of the beam and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The above description of the header refers only schematically to the construction since the details of the construction are well known to one skilled in the art.

Referring also to FIG. 2, the adapter 11 comprises a frame 20 which attaches to the feeder house 12 and carries at its lower end a pair of forwardly extending pivotal arms 21 which form respective first and second spring biased lifting members and which extend forwardly underneath respective ones of the frame members 15 of the header. The pivotal arms 21 can pivot upwardly and downwardly about respective pivot pins 23 each independently of the other arm. Each arm is supported by a respective spring 24 attached to the respective arm 21. Thus the respective springs 24 provide respective first and second spring lifting forces which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly in the form of a hydraulic cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

The above description applies both to the conventional rigid header where the transverse beam 14 is substantially rigid along its length. In the embodiment of the type with which the present invention is concerned, the header is formed in a number of sections which are independently pivotal each relative to the next and in which adjustment of the lifting force provided by the springs 24 is transferred to each of the sections proportionally so that each section can float upwardly and downwardly and each section applies a force to the ground which is proportional to the total force of the whole header.

Thus the beam 14 forms a main frame structure which is divided into a number of separate pieces depending upon the number of sections of the header. In the embodiment shown there are three sections including a center section or center frame portion 10A, a first wing section or wing frame portion 10B and a second wing section or wing frame portion 10C. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Figure 4:
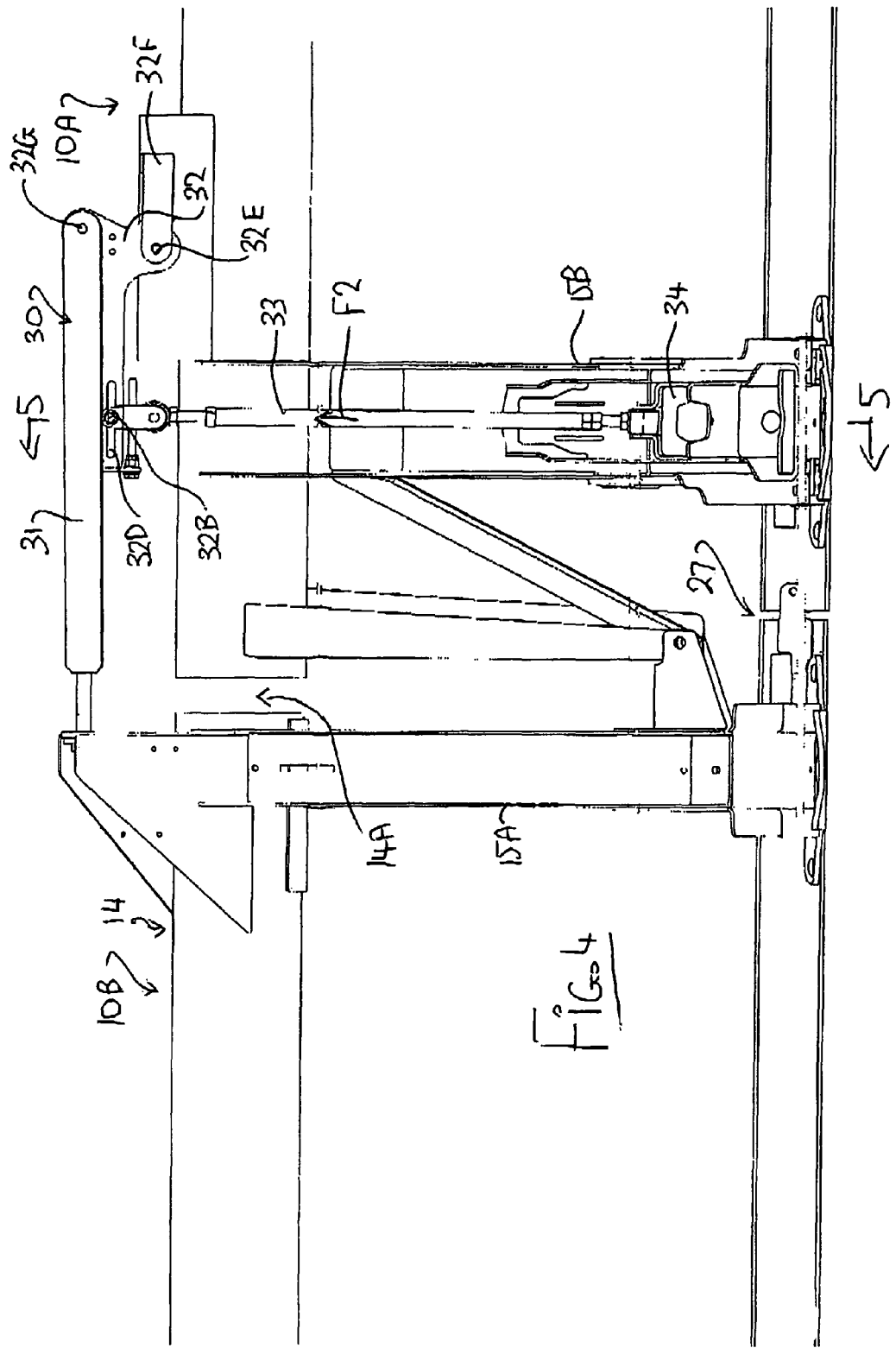
FIG. 4 is a rear elevational view of the header of FIG. 3.

Thus the beam 14 is split into three portions each co-operating with a respective one of the sections 10A, 10B and 10C and defining a main beam therefor. Each section of the beam 14 includes respective ones of the frame members 15 which support the respective portion of the table. Thus as best shown in FIG. 4, there is a break 14A between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A defining a first pivot connection lying on the pivot axis between the wing section 10B and the center section 10A.

Thus the two sections 10A and 10B are supported each relative to the other for pivotal movement of the wing section 10B about an axis extending through the pin 27A and through the break 14A so that the wing section is supported at its inner end on the center section but can pivot downwardly at its outer end so that the weight at the outboard end is unsupported by the center section and causes downward or counter clockwise pivotal movement of the wing section 10B.

The wing section 10C is mounted in an identical or symmetrical manner for pivotal movement about the other end of the center section 10A. The amount of pivotal movement allowed of the wing section relative to the center section about the axis of the pivot pin 27A is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

The outboard weight of the wing section 10B is supported on a linkage 30 which communicates that weight from the inner end of the beam 14 of the section 10B through to the support for the center section 10A at the springs 24. The linkage is shown particularly in FIGS. 4 and 5 and includes a tension link 31 extending from the inner end of the beam 14 to a bell crank 32 at the outer end of the center section 10A on the beam 14 together with a further compression link 33 which extends downwardly from the bell crank to a balance beam 34 located on the center section 10A at its interconnection with the arm 21.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99%. of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This is achieved in this embodiment by a balancing system which includes a linkage connecting the force to the sing section and particularly the balancing beam 34. Thus the balance beam 34 as described in more detail hereinafter balances the lifting force applied to the ends of the center section relative to the lifting force which is applied to the outboard weight of the wing section so that the lifting force is even across the width of the header.

It will be appreciated that the inboard weight of the wing section is transferred through the pivot 27 to the outboard end of the center section and that weight is transferred directly to the balance beam 34. Also the outboard weight of the wing section is transferred through the link 31 and the bell crank 32 to the balance beam 34. Yet further a lifting force from the arm 21 is applied to the balance beam.

Figure 3:
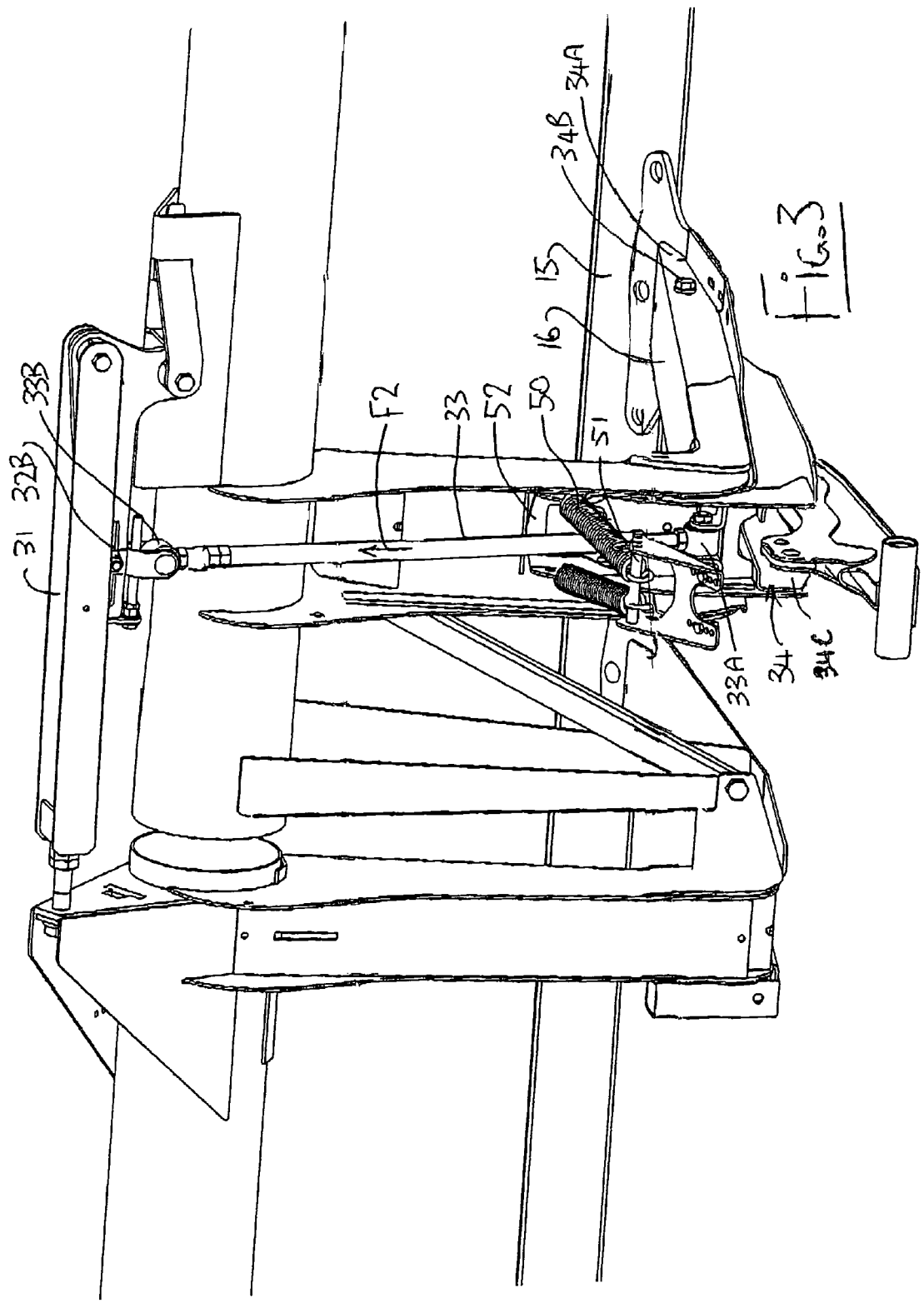
FIG. 3 is an isometric view from the rear and one side of one embodiment of the header according to the present invention with the adapter removed.

Thus reviewing FIGS. 3 and 4, the balance beam 34 is located above the arm 21. The balance beam 34 has a forward end 34A which is pivotally connected to the frame member 15 at a transverse pivot pin 34B. The arm 21 extends forwardly to a forward lifting point 21A which engages underneath a forward end 34A of the balance beam. Thus the lifting force from the arm 21 is applied upwardly at the point 21A which is forward of the beam 14 and underneath the table 16.

The balance beam 34 extends rearwardly from the forward end 34A rearwardly to a rear end 34C to which is connected the compression link 33 at a bushing 33A. The compression link or compression member 33 thus applies an upward pushing force which acts to support the outboard weight of the wing section and also applies some lifting force to the center section through the bell crank 32.

The pivot pin 34B is attached to the center section so that some weight from the center section, which is not carried on the bell crank, is transferred to the pivot pin and through that pin to the balance beam 34.

The lifting force from respective one of the first and second lift arms 21 is wholly applied at the respective one of the first and second lifting positions 21A of the balance beam. Thus these three forces are all applied to the balance beam and the balance beam acts to automatically proportion the forces relative to the lifting force.

Thus the support assembly includes a first component which is the pin 34B to provide a lifting force for the center frame portion. The support assembly which is the linkage includes a second component which is a tension link 33 arranged to provide a lifting force F2 for the outboard weight of the second or wing frame portion.

The whole support assembly including the balance beam 34, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The balance beam 34 is arranged such that the first and second lifting forces F1 and F2 are varied proportionally as the total lifting force FT is varied. As the force F2 includes the force lifting the wing section and a part of the force lifting the center section, this can be balanced relative to the lifting force F1 which applies a lifting force to the center section. The geometry of the balance beam and the linkage including the bell crank is arranged such that the balancing system defined thereby provides the lifting forces to the center section and wing section as defined above.

It will be noted that the linkage provided by the tension link 31, compression link 33 and the bell crank 32 includes no spring connection and is a direct mechanical linkage so that the spring action or floating action of the wing section is provided by the spring 24.

The balance beam 34 extends parallel to the arm 21 so that the pivot pins or bushings 34B and 33A have an axis at right angles to the balance beam and to the arm 21. The forces extend generally at right angles to the arm 21 since the arm 21 is generally horizontal underneath the header frame and underneath the balance beam.

The bell crank 32 is located and supported on the beam 14 so that the link 31 extends along the length of the beam 14 across the space 14A. Thus the link 31 is located above the pivot 27A and communicates forces by tension.

The compression link 33 is pivotally attached to the bell crank at a pivot connection pin 32B. The length of the arm 32C of the bell crank 32 can be adjusted by sliding the pin 32B along a slot 32D thus adjusting the mechanical advantage of the bell crank to vary the mechanical advantage or moment of the force F2 transferred to the outboard weight of the wing section. Thus the bell crank can be adjusted so that the forces F1 and F2 are balanced to produce approximately uniform contact pressure between the ground and the skid shoe. The bell crank 32 is pivoted at pin 32E carried on a support 32F attached to the frame. The link 31 attaches to the bell crank 32 at the pin 32G.

In the present arrangement as compared to the previous patent of Patterson identified above, the arrangement for the balancing of the forces from the wing section and the center section relative to the lifting load are carried out using a compression link 33 as opposed to the tension link of the prior patent. This compression link is attached to the balance beam 34 at a position closely adjacent its rear end. The forward end 34A of the balance beam is attached to the frame member 15 at the pin 34B which is closely adjacent the cutter bar so that the balance beam 34 provides a long lever length between the pivot pin 34B and the compression link 33. The forward end of the lift arm 21 is located on the balance beam 34 at a position close to the rear end so that the distance between the link 33 and its coupling 33A and the lifting point 21A is significantly smaller than the distance between the lifting point 21A and the pivot pin 34B which transfers the load from the main portion of the header. These lengths allow the forces in the compression link 33 to be significantly smaller than the forces in the corresponding tension link in the above patent. In addition in the previous patent, the use of a tension link pulling down on the center section dramatically increases the load applied to the center section at the pivot point of the balance beam. The use of the geometry set forth herein and the use of a compression link in place of the tension link can reduce the forces applied at the pivot to as little as one sixth of the previous force. The reduction in the forces through the compression link allows the couplings 33A at the lower end and 33B at the upper end of the link 33 to be formed as rubber bushings. These rubber bushings accommodate the necessary rotation which is relatively small while providing low frictional forces while accommodating that rotation. These low frictional forces thus reduce the total friction through the linkage system to reduce inertia and to allow the pivoting action to occur more effectively at lower forces.

The balance beam 34 is located wholly within and protected by the bottom portion of the frame member 15 which projects forwardly as a channel underneath the table 16.

A further modification relative to the previous patent is provided by the addition of a system to account for force changes on the balance beam due to changes in angle of the header relative to the mounting assembly.

Figure 6:
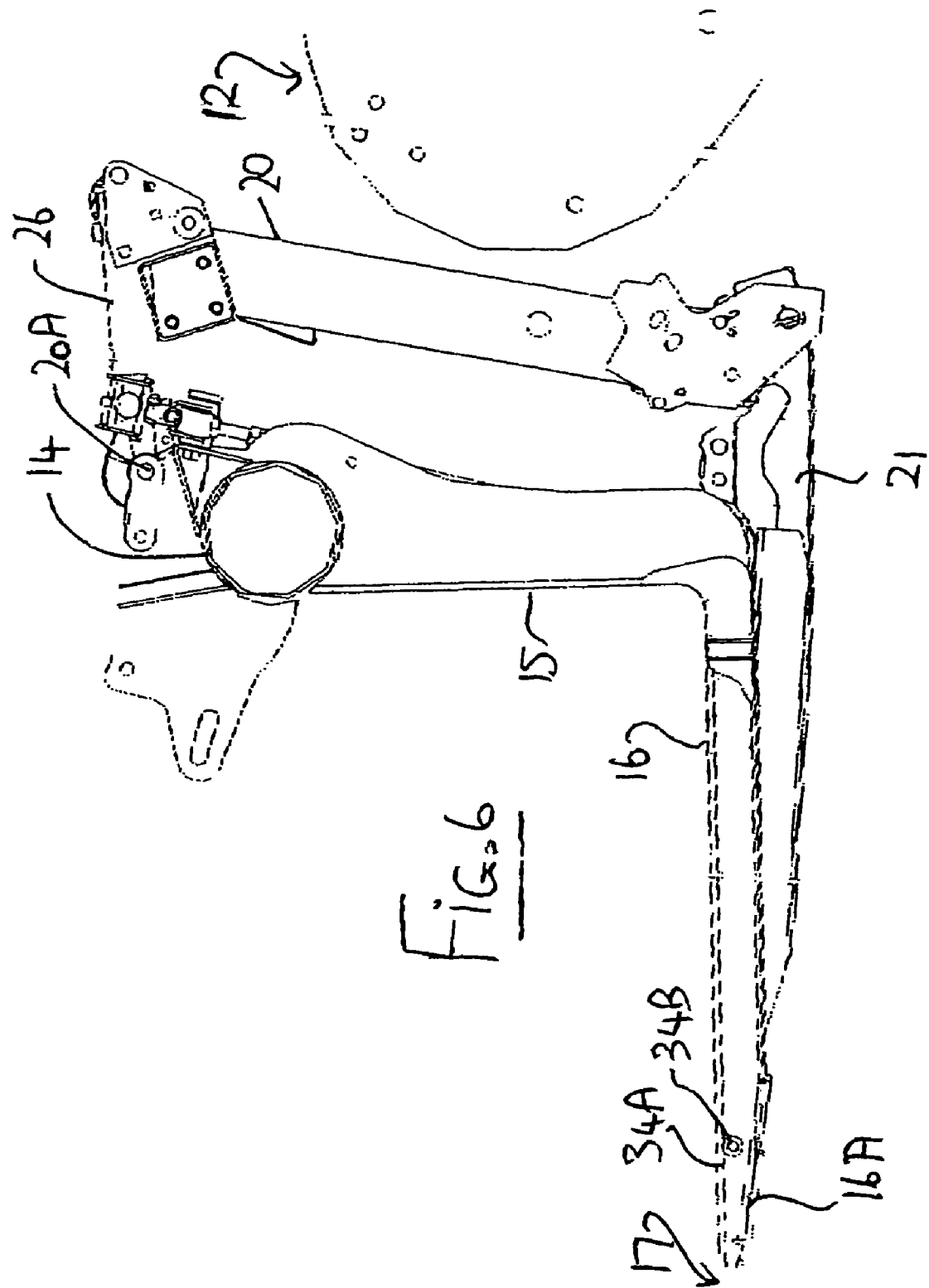
FIG. 6 is a cross sectional view similar to that of FIG. 4 of second embodiment of header.
Figure 7:
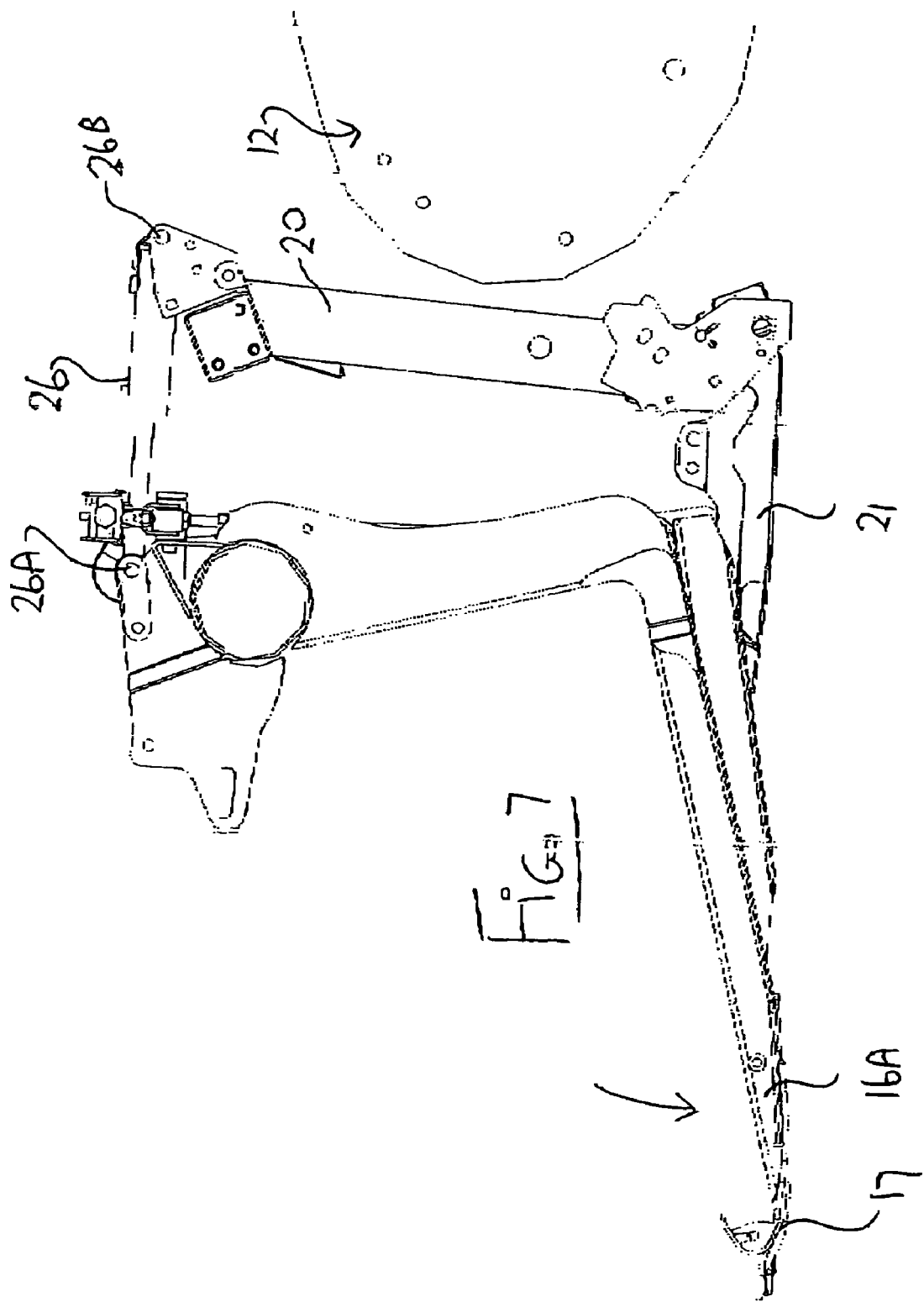
FIG. 7 is a cross sectional view of the embodiment of FIG. 6 showing the header at an increased angle.

Thus in comparing FIGS. 6 and 7, it will be noted that one possible movement of the header relative to the mounting frame 20 is obtained by tilting the header so as to increase the angle of the table 16 relative to the ground. This movement is obtained by extending the link 26 at the top of the header. That link is provided in the form of a cylinder which allows an end coupling 26A of that cylinder to move outwardly away from its support 26B on the frame 20. The header frame then pivots about the forward end of the arms 21 at the connection between the forward end 21A and the balance beam 34 so that the table tilts in the counter clockwise direction as shown in FIG. 7 so that the cutter bar 16 moves downwardly. This moves the cutter bar downwardly relative to the skid plate so that the cutting action of the knife moves closer to the ground as the skid plate 16A runs over the ground.

This adjustment of the header is of course well known and it is common that the operator initially sets the header in an aggressive position so that the angle of the table 16 upwardly and rearwardly from the cutter bar 17 is as high as possible to bring the knife as close as possible to the ground. In the event that this action causes the knife to dig into the ground or for excessive material to be lifted onto the table, the operator can then reduce the angle of the table by turning the table in the clockwise direction by shortening the link 26 so as to slightly lift the knife relative to the ground.

In a second adjustment movement of the header as shown by comparing FIGS. 6 and 8, the height of the feeder house 12 can be adjusted so as to raise and lower the frame 20 relative to the header. Thus the operator can operate the drive system of the feeder house to lower the feeder house which pushes the frame 20 downwardly so as to apply reduced lifting force to the header and therefore to allow greater weight to be applied from the header to the ground.

Again the operator can initially set the machine with the feeder house at a lowered position thus applying a heavier weight from the header to the ground and the operator can lift the feeder house if required so as to reduce the pressure from the header to the ground should this become necessary due to excessive digging into the ground of the cutter bar or excessive lifting of material from the ground onto the table.

Careful analysis of the forces involved in the system and their relation to the balance beam 34 have determined that, when the header angle is increased relative to the ground or the header is floated by pushing the feeder house down then the reaction pushing on the balanced channel from the wings goes up and the moment of that reaction also increases. At the same time the effect of gravity is decreased due to the change in angle of the pivot 27A and thus the forces required to balance the wings are reduced. As a result the effect of these movements is such that the effective weight of the wings is reduced so that pressure on the ground from the wings is reduced relative to the center section.

This careful analysis has therefore revealed that it is necessary to compensate for these effects on the balance beam. Thus if the operator operates the link 26 so as to increase the angle of the header and/or if the operator operates the feeder house to move the frame 20 downwardly relative to the header then action must be taken on the balance beam to reduce the upward force on the compression link 33. The intention is that the pressure on the ground remains balanced regardless of this movement of the header relative to the frame 20.

Figure 5:
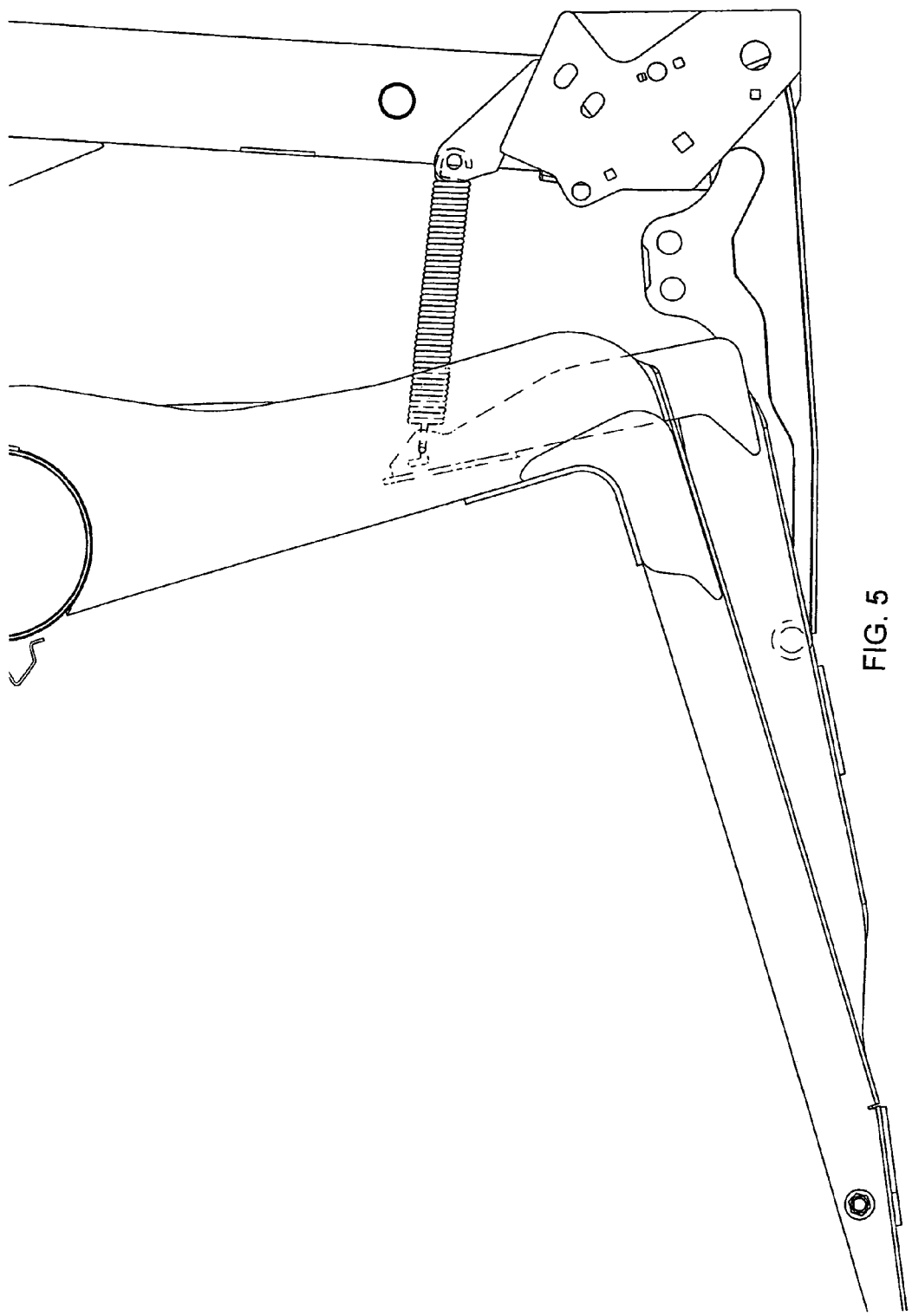
FIG. 5 is a cross sectional view along the lines 5-5 of FIG. 4 of the header of FIG. 3 on an enlarged scale showing the trim coil spring.

In FIGS. 3, 4 and 5 is shown a first technique for applying a force to the balance beam 34 when either of the above events occurs. This is obtained by providing one or more compensating springs 50 which are connected to the balance beam 34 and the frame 20. In the embodiment shown there are two such parallel springs each on a respective side of the compression link 33. The springs extend from a mounting pin 51 on the frame 20 and extend to a tower portion 52 standing upwardly from the rear end of the balance beam 34. Thus the springs apply a force tending to pivot the balance beam 34 about the pivot point 21A at the forward end of the arms 21. This force therefore applies to the balance beam a tendency for the balance beam to rotate downwardly at the rear and thus reduces the forces applied from the balance beam upwardly onto the compression link 33. The amount of reduction of this force is of course proportional to the force applied from the springs 50. This force is dependent upon the amount of extension of the springs, that is the amount of movement between the frame 20 and the frame member 15 of the header. In addition the amount of force is dependent upon the position of the pin 51 relative to the forward end of the springs on the tower 52 of the balance beam 34. This increase in distance between the tower portion 52 and the pin 51 can be obtained either by the frame member 15 moving forwardly relative to the frame 20 or by the frame member 15 moving upwardly relative to the frame member 20. It will be appreciated also that the changes of angle in the spring relative to the tower portion 52 to which they are attached will also provide some change in the moment applied by the springs about the pivot pin 21A of the balance beam. However careful analysis of the matter and careful selection of the pivot points and connection points can allow the springs to provide the required level of compensation on the forces of the balance beam in dependence upon the movement of the frame member 15 relative to the frame 20. Thus the compensating springs 50 define first and second elements arranged to be responsive to the adjustment movement and arranged in response to the adjustment movement to operate on the first balance beam to change the balance of forces between the first wing lifting force and the first center frame portion lifting force in proportion to the amount of adjustment movement.

In FIGS. 6 through 10 is shown an alternative arrangement for affecting the forces on the balance beam 34. This arrangement avoids the necessity for an additional spring component 50 connected between the header and the adaptor. This spring component can effectively provide the required forces but provides in addition a further connection between those two components which requires the connection to be completed or disconnected in the event that the header is attached to or removed from the adaptor. This of course requires an additional step to be undertaken by the operator which is inconvenient and if forgotten can cause damage. The arrangement of FIGS. 6 through 10 thus provides compensation for the forces on the balance beam 34 without an additional component. In general this arrangement provides the compensation by moving the pivot point 21A relative to the balance beam 34.

In FIG. 9 is shown an enlarged view the connection of the forward end of the arm 21 to the balance beam 34. FIG. 10 shows the same connection point but in relation to the position of the components as shown in FIG. 8.

It will be noted therefore that the pivot point indicated at 21C in FIG. 9 is rearward from the pivot point indicated at 21D in FIG. 10. This movement is obtained by providing a curved surface 21E on the part of the arm 21 which engages the underside 34E of a member 341 engaging the balance beam 34 at a fixed position thereon. Thus in effect the pivot point rolls along the top surface 21E as the angle is changed between the arm 21 and the balance beam 34.

The member 341 comprises a resilient block 34F on the underside of the balance beam 34 which can flex as the curved surface 21E pivots across that surface of the block. A spring strap 34G is attached to a down-turned front portion 34X of the block 34F connected thereto by a bolt 34J. The spring strap thus includes a down-turned portion 34H at right angles to the surface 34E and the spring strap is bent at a right angle at a corner 34K. From the corner 34K, the spring strap extends across between the bottom surface 34E of the flexible block 34F and across the top surface of the curved end portion 21E of the arm 21. The strap has a rear end 34L which is bolted to the surface 21E by a bolt 34M. Thus the strap provides a connection between the block 34F and the curved surface 21E. This strap therefore holds these elements at a fixed position along their length so that they cannot move longitudinally one relative to the other but as the angle changes between the elements, the spring strap allows the pivot point to move along the bottom surface 34E of the resilient block 34F as described above.

The block 34F has a top plate 34S and a front down-turned plate 34T which form an abutment for engaging into a similarly shaped receptacle in the balance beam 34. Thus the block 34F engages the balance beam and provides a connection between the end of the arm 21 and the balance beam. The curved surface 21E can be formed by a pair of parallel plates bridged by the strap 34G.

One extreme position is shown in FIG. 9 where the pivot point 24C is close to the end of the block 34F remote from the leg 34H. The opposite extreme position is shown in FIG. 10 where the pivot point moves to a position closely adjacent the end of the strap adjacent the leg 34H. Intermediate positions can of course be assumed as the angle smoothly changes between these two extreme positions. It will be appreciated that the pivot point is not a specific point between the two elements but occurs over a contact area due to the flexibility of the strip 34G and the block 34F under pressure from the curved surface 21E.

It will be appreciated that movement of the pivot point of the balance beam 34 from a position closer to the compression link 33 to a position further away from compression link 33 acts to reduce the actual compression force applied to the link 33. Thus the balance between the force applied to the center section of the header changes relative to the force applied to the wing section of the header. In this way the tendency of the wings to move upwardly because they become too light is compensated by this movement of the pivot point. Thus the shape and arrangement of the balance beam and particularly its pivot point define first and second elements arranged to be responsive to the adjustment movement and arranged in response to the adjustment movement to operate on the first balance beam to change the balance of forces between the first wing lifting force and the first center frame portion lifting force in proportion to the amount of adjustment movement.

A person skilled in the art will be able to calculate the geometry involved in providing the necessary movement of the pivot point in dependence upon the relative angles of the arm and the balance beam. This system therefore of compensating the change in balance between the forces allows the compensation to occur without any additional elements which are connected between the header and the adaptor. The compensation occurs automatically so that the three sections of the header remain properly in balance during the changes of angle between the adaptor and the header which would otherwise cause the wings to become too light.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense

The invention claimed is:

1. A crop harvesting header comprising:
   a main frame structure extending across a width of the header for movement in a forward direction generally at right angles to the width across ground including a crop to be harvested;
   a mounting assembly for carrying the main frame structure on a propulsion vehicle;
   a crop receiving table carried on the main frame structure across the width of the header;
   a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground tending to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first spring biased lifting member for applying a first spring lifting force and a second spring biased lifting member for applying a second spring lifting force arranged at transversely spaced positions on the center frame portion of the main frame structure;

a first linkage for applying a first wing lifting force to the first wing frame portion in a direction to support the first wing frame portion against said rotating movement about the first pivot coupling;

a second linkage for applying a second wing lifting force to the second wing frame portion in a direction to support the second wing frame portion against said rotating movement about the second pivot coupling;

a first balance system including a first balance beam pivotally connected at a first pivot connection to the center frame portion of the main frame structure for applying a first center frame portion lifting force to the center frame portion;

the first balance beam being connected to the first linkage so as to apply thereto the first wing lifting force;

the first balance beam being arranged to receive the first spring lifting force from the first spring biased lifting member at a first lift position therealong so as to balance the first spring lifting force between the first center frame portion lifting force and the first wing lifting force;

and a second balance system including a second balance beam pivotally connected at a second pivot connection to the center frame portion of the main frame structure for applying a second center frame portion lifting force to the center frame portion;

the second balance beam being connected to the second linkage so as to apply thereto the second wing lifting force;

the second balance beam being arranged to receive the second spring lifting force from the second spring biased lifting member at a second lift position therealong so as to balance the second spring lifting force between the second center frame portion lifting force and the second wing lifting force;

wherein the mounting assembly is connected to the main frame structure so as to allow adjustment movement of the main frame structure relative to the mounting assembly;

wherein there is provided a first element arranged to be responsive to the adjustment movement and arranged in response to the adjustment movement to operate on the first balance beam to change the balance of forces between the first wing lifting force and the first center frame portion lifting force in proportion to the amount of adjustment movement;

and wherein there is provided a second element responsive to the adjustment movement to operate on the second balance beam to change the balance of forces between the second wing lifting force and the second center frame portion lifting force in proportion to the amount of adjustment movement.

2. The header according to claim 1 wherein the first balance beam is connected to a first compression member of the first balance system so as to apply the first wing lifting force as a compression force longitudinally of the first compression member; and wherein the second balance beam is connected to a second compression member of the second balance system so as to apply the second wing lifting force as a compression force longitudinally of the second compression member.

3. The header according to claim 2 wherein the first balance beam is arranged such that a distance from the first pivot connection to the first lift position is greater than the distance from the first lift position to the first compression member and wherein the second balance beam is arranged such that a distance from the second pivot connection to the second lift position is greater than the distance from the second lift position to the second compression member.

4. The header according to claim 2 wherein the first and second balance beams are oriented such that each has its longitudinal direction parallel to the forward direction.

5. The header according to claim 4 wherein the first balance beam is pivoted on the first pivot connection at a forward end thereof and the second balance beam is pivoted on the second pivot connection at a forward end thereof.

6. The header according to claim 4 wherein each of the first and second pivot connections is arranged adjacent the cutter bar.

7. The header according to claim 2 wherein the first balance beam and the first linkage is arranged such that the first wing lifting force and the first center frame portion lifting force vary proportionally and wherein the second balance beam and the second linkage is arranged such that the second wing lifting force and the second center frame portion lifting force vary proportionally.

8. The header according to Claim 2 wherein the first spring biased lifting member includes a first lift arm extending in the forward direction parallel to and underneath the first balance beam and wherein the second spring biased lifting member of the mounting assembly includes a second lift arm extending in the forward direction parallel to and underneath the second balance beam.

9. The header according to claim 1 wherein the mounting assembly includes at least one upper mounting link connected to the main frame structure which is operable to effect an angle change of the crop receiving table and the cutter bar relative to the ground about an axis generally parallel to the cutter bar and wherein the first and second elements are responsive to the change of angle.

10. The header according to claim 9 wherein the first element is arranged to reduce the first wing lifting force relative to the first center frame portion lifting force when the header is pivoted to increase the angle of the table relative to the ground and wherein the second element is arranged to reduce the second wing lifting force relative to the second center frame portion lifting force when the header is pivoted to increase the angle of the table relative to the ground.

11. The header according to claim 1 wherein the mounting assembly is connected to the main frame structure in a manner which allows the height of the mounting assembly to be changed relative to the main frame structure to allow the skid element to rest on the ground in a floating action and wherein the first and second elements are responsive to the change of height.

12. The header according to claim 11 wherein the first element is arranged to reduce the first wing lifting force relative to the first center frame portion lifting force when the mounting assembly is lowered relative to the main frame structure and wherein the second element is arranged to reduce the second wing lifting force relative to the second center frame portion lifting force when the mounting assembly is lowered relative to the main frame structure.

13. The header according to claim 1 wherein the first element is arranged to apply an additional force to the first balance beam and wherein the second element is arranged to apply an additional force to the second balance beam.

14. The header according to claim 13 wherein the additional force is applied by a first additional spring separate from and additional to a first lift spring of the first spring biased lifting member connected between the first balance beam and the mounting assembly and a second additional spring separate from and additional to a second lift spring of the first spring biased lifting member connected between the second balance beam and the mounting assembly.

15. The header according to claim 1 wherein the first element is arranged to move the first lift position along the first balance beam and wherein the second element is arranged to move the second lift position along the second balance beam.

16. The header according to claim 15 wherein the first spring biased lifting member includes a first arm extending longitudinally of the first balance beam and wherein the first arm includes a first surface which is shaped such that its point of contact with the first balance beam moves longitudinally of the first balance beam as an angle between a longitudinal direction of the first arm and a longitudinal direction of the first balance beam changes and wherein the second spring biased lifting member includes a second arm extending longitudinally of the second balance beam and wherein the second arm includes a second surface which is shaped such that its point of contact with the second balance beam moves longitudinally of the second balance beam as an angle between a longitudinal direction of the second arm and a Longitudinal direction of the second balance beam changes.

17. The header according to claim 16 wherein the surface of the first arm is curved along its length and there is provided a first spring strip attached to the first arm with the curved surface of the first arm rolling along the first spring strip as the angle of the first arm relative to the first balance beam changes and wherein the surface of the second arm is curved along its length and there is provided a second spring strip attached to the second arm with the curved surface of the second arm rolling along the second spring strip as the angle of the second arm relative to the second balance beam changes.

18. A crop harvesting header comprising:
 a main frame structure extending across a width of the header for movement in a forward direction generally at right angles to the width across ground including a crop to be harvested;
 a mounting assembly for carrying the main frame structure on a propulsion vehicle;
 a crop receiving table carried on the main frame structure across the width of the header;
 a cutter bar across a front of the table arranged to move over the ground in a cutting action and carrying a cutter knife operable for cutting the crop as the header is moved forwardly across the ground for depositing the crop onto the table;
 a skid element extending across the width of the header for engaging the ground so as to receive lifting forces from the ground at whatever points of the skid element contact the ground in a direction to lift the cutter bar;
 a crop transport system on the table for moving the cut crop toward a discharge location of the header;
 the main frame structure including a center frame portion, a first wing frame portion and a second wing frame portion;
 the first wing frame portion being connected to the center frame portion by a first pivot coupling arranged for pivotal movement of the first wing frame portion relative to the center frame portion about a first pivot axis extending in a plane parallel to the forward direction;
 the first pivot coupling thus acting to support weight from the first wing frame portion at the pivot coupling while weight from the first wing frame portion outboard of the first pivot coupling tends to rotate the first wing frame portion about the first pivot coupling in a downward direction;
 the second wing frame portion being connected to the center frame portion by a second pivot coupling arranged for pivotal movement of the second wing frame portion relative to the center frame portion about a second pivot axis extending in a plane parallel to the forward direction;
 the second pivot coupling thus acting to support weight from the second wing frame portion at the second pivot coupling while weight from the second wing frame portion outboard of the second pivot coupling tends to rotate the second wing frame portion about the second pivot coupling in a downward direction;
 the mounting assembly including a first spring biased lifting member including a first lift spring for applying a first spring lifting force and a second spring biased lifting member including a second lift spring for applying a second spring lifting force arranged at transversely spaced positions on the center frame portion of the main frame structure;
 a first linkage for applying a first wing lifting force to the first wing frame portion in a direction to support the first wing frame portion against said rotating movement about the first pivot coupling;
 a second linkage for applying a second wing lifting force to the second wing frame portion in a direction to support the second wing frame portion against said rotating movement about the second pivot coupling;
 a first balance system including a first balance beam pivotally connected at a first pivot connection to the center frame portion of the main frame structure for applying a first center frame portion lifting force to the center frame portion;

the first balance beam being connected to the first linkage so as to apply thereto the first wing lifting force;

the first balance beam being arranged to receive the first spring lifting force from the first spring biased lifting member at a first lift position therealong so as to balance the first spring lifting force between the first center frame portion lifting force and the first wing lifting force;

and a second balance system including a second balance beam pivotally connected at a second pivot connection to the center frame portion of the main frame structure for applying a second center frame portion lifting force to the center frame portion;

the second balance beam being connected to the second linkage so as to apply thereto the second wing lifting force;

the second balance beam being arranged to receive the second spring lifting force from the second spring biased lifting member at a second lift position therealong so as to balance the second spring lifting force between the second center frame portion lifting force and the second wing lifting force;

wherein the mounting assembly is connected to the main frame structure so as to allow adjustment movement of the main frame structure relative to the mounting assembly;

wherein there is provided a first additional spring separate from and additional to the first lift spring connected between the first balance beam and the mounting assembly, wherein the first additional lift spring is arranged to be responsive to the adjustment movement and arranged in response to the adjustment movement to apply a first additional spring force to the first balance beam;

and wherein there is provided a second additional spring separate from and additional to the second lift spring connected between the second balance beam and the mounting assembly, wherein the second additional lift spring is arranged to be responsive to the adjustment movement and arranged in response to the adjustment movement to apply a second additional spring force to the second balance beam.

19. A crop harvesting header comprising:

a main frame structure extending across a width of the header for movement in a forward direction generally at right angles to the width across ground including a crop to be harvested;

a mounting assembly for carrying the main frame structure on a propulsion vehicle;

a crop receiving table carried on the main frame structure across the width of the header;

a cutter bar across a front of the table arranged to move over the ground in a cutting action and carrying a cutter knife operable for cutting the crop as the header is moved forwardly across the ground for depositing the crop onto the table;

a skid element extending across the width of the header for engaging the ground so as to receive lifting forces from the ground at whatever points of the skid element contact the ground in a direction to lift the cutter bar;

a crop transport system on the table for moving the cut crop toward a discharge location of the header;

the main frame structure including a center frame portion, a first wing frame portion and a second wing frame portion;

the first wing frame portion being connected to the center frame portion by a first pivot coupling arranged for pivotal movement of the first wing frame portion relative to the center frame portion about a first pivot axis extending in a plane parallel to the forward direction;

the first pivot coupling thus acting to support weight from the first wing frame portion at the pivot coupling while weight from the first wing frame portion outboard of the first pivot coupling tends to rotate the first wing frame portion about the first pivot coupling in a downward direction;

the second wing frame portion being connected to the center frame portion by a second pivot coupling arranged for pivotal movement of the second wing frame portion relative to the center frame portion about a second pivot axis extending in a plane parallel to the forward direction;

the second pivot coupling thus acting to support weight from the second wing frame portion at the second pivot coupling while weight from the second wing frame portion outboard of the second pivot coupling tends to rotate the second wing frame portion about the second pivot coupling in a downward direction;

the mounting assembly including a first spring biased lifting member for applying a first spring lifting force and a second spring biased lifting member for applying a second spring lifting force arranged at transversely spaced positions on the center frame portion of the main frame structure;

a first linkage for applying a first wing lifting force to the first wing frame portion in a direction to support the first wing frame portion against said rotating movement about the first pivot coupling;

a second linkage for applying a second wing lifting force to the second wing frame portion in a direction to support the second wing frame portion against said rotating movement about the second pivot coupling;

a first balance system including a first balance beam pivotally connected at a first pivot connection to the center frame portion of the main frame structure for applying a first center frame portion lifting force to the center frame portion;

the first balance beam being connected to the first linkage so as to apply thereto the first wing lifting force;

the first balance beam being arranged to receive the first spring lifting force from the first spring biased lifting member at a first lift position therealong so as to balance the first spring lifting force between the first center frame portion lifting force and the first wing lifting force;

and a second balance system including a second balance beam pivotally connected at a second pivot connection to the center frame portion of the main frame structure for applying a second center frame portion lifting force to the center frame portion;

the second balance beam being connected to the second linkage so as to apply thereto the second wing lifting force;

the second balance beam being arranged to receive the second spring lifting force from the second spring biased lifting member at a second lift position therealong so as to balance the second spring lifting force between the second center frame portion lifting force and the second wing lifting force;

wherein the mounting assembly is connected to the main frame structure so as to allow adjustment movement of the main frame structure relative to the mounting assembly;

wherein the first balance beam is arranged such that the location of the lift position thereon is movable to different positions longitudinally along the first balance beam and wherein the first balance beam is arranged such that said adjustment movement causes movement of the location of the lift position along the first balance beam;

and wherein the second balance beam is arranged such that the location of the lift position thereon is movable to different positions longitudinally along the second balance beam and wherein the second balance beam is arranged such that said adjustment movement causes movement of the location of the lift position along the second balance beam.

* * * * *